United States Patent
Bai et al.

(10) Patent No.: US 12,550,074 B2
(45) Date of Patent: Feb. 10, 2026

(54) POWER CONTROL IN FULL DUPLEX SYSTEMS BASED ON PL-RS FOR SELF-INTERFERENCE MEASUREMENT

(71) Applicant: QUALCOMM Incorporated, San Diego, CA (US)

(72) Inventors: Tianyang Bai, Somerville, NJ (US); Hua Wang, Basking Ridge, NJ (US); Kiran Venugopal, Raritan, NJ (US); Junyi Li, Fairless Hills, PA (US); Vasanthan Raghavan, West Windsor Township, NJ (US); Jung Ho Ryu, Fort Lee, NJ (US); Qian Zhang, Basking Ridge, NJ (US); Navid Abedini, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 670 days.

(21) Appl. No.: 17/449,437

(22) Filed: Sep. 29, 2021

(65) Prior Publication Data
US 2022/0110068 A1    Apr. 7, 2022

Related U.S. Application Data

(60) Provisional application No. 63/088,152, filed on Oct. 6, 2020.

(51) Int. Cl.
*H04W 52/24* (2009.01)
*H04L 5/14* (2006.01)
(Continued)

(52) U.S. Cl.
CPC ............. *H04W 52/243* (2013.01); *H04L 5/14* (2013.01); *H04W 24/08* (2013.01); *H04W 52/146* (2013.01)

(58) Field of Classification Search
CPC . H04W 52/243; H04W 24/08; H04W 52/146; H04W 52/24; H04W 52/367;
(Continued)

(56) References Cited

U.S. PATENT DOCUMENTS

2017/0041118 A1\* 2/2017 Liu ........................ H04L 1/0003
2017/0041121 A1\* 2/2017 Noh ..................... H04W 52/243
(Continued)

FOREIGN PATENT DOCUMENTS

EP         3644645 A1    4/2020
WO    2015126708 A1    8/2015
(Continued)

OTHER PUBLICATIONS

International Search Report and Written Opinion—PCT/US2021/052971—ISA/EPO—Jan. 14, 2022.

*Primary Examiner* — Ricky Q Ngo
*Assistant Examiner* — David M Kayal
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for power control in FD systems based on a PL-RS for measuring self-interference. In aspects, a base station may configure a PL-RS for one or more beam pairs and schedule a DL transmission including the PL-RS. A UE may measure self-interference corresponding to the one or more beam pairs based on the PL-RS and adjust an UL Tx power for a FD operation based on the self-interference measured for the one or more beam pairs. The UE may subsequently
(Continued)

transmit an UL transmission for the FD operation based on the adjustment to the UL Tx power, such that the base station may receive an UL transmission having an UL Tx power that is based on the measured self-interference associated with the PL-RS.

22 Claims, 13 Drawing Sheets

(51) Int. Cl.
 *H04W 24/08* (2009.01)
 *H04W 52/14* (2009.01)
(58) Field of Classification Search
 CPC ... H04W 52/42; H04W 52/242; H04W 52/30; H04W 52/36; H04W 52/38; H04W 52/245; H04W 52/286; H04W 52/325; H04W 24/10; H04W 24/00; H04W 28/0236; H04W 28/0838; H04L 5/14; H04L 5/0048
 See application file for complete search history.

(56) References Cited

U.S. PATENT DOCUMENTS

| | | | |
|---|---|---|---|
| 2017/0054544 A1* | 2/2017 | Kazmi | H04L 5/14 |
| 2018/0083679 A1 | 3/2018 | Lim et al. | |
| 2019/0132033 A1 | 5/2019 | Akkarakaran et al. | |
| 2019/0245631 A1* | 8/2019 | Kim | H04B 15/04 |
| 2019/0260485 A1 | 8/2019 | Byun et al. | |
| 2019/0349867 A1 | 11/2019 | Molavianjazi et al. | |
| 2020/0214018 A1 | 7/2020 | Venugopal et al. | |
| 2020/0229111 A1 | 7/2020 | Kim et al. | |
| 2021/0021399 A1* | 1/2021 | Liu | H04L 1/0003 |
| 2021/0028814 A1* | 1/2021 | Lee | H04B 1/123 |
| 2021/0344558 A1* | 11/2021 | Lee | H04L 41/0803 |
| 2022/0053353 A1* | 2/2022 | Lee | H04B 7/0408 |
| 2023/0224818 A1* | 7/2023 | Haghighat | H04W 52/146 455/522 |
| 2024/0023183 A1* | 1/2024 | Deenoo | H04B 7/088 |

FOREIGN PATENT DOCUMENTS

| | | |
|---|---|---|
| WO | 2019089589 | 5/2019 |
| WO | 2020190098 A1 | 9/2020 |

* cited by examiner

POWER CONTROL IN FULL DUPLEX SYSTEMS BASED ON PL-RS FOR SELF-INTERFERENCE MEASUREMENT

CROSS REFERENCE TO RELATED APPLICATION(S)

This application claims the benefit of and priority to U.S. Provisional Application Ser. No. 63/088,152, entitled "Power Control in Full Duplex Systems based on PL-RS for Self-Interference measurement" and filed on Oct. 6, 2020, which is expressly incorporated by reference herein in its entirety.

TECHNICAL FIELD

The present disclosure relates generally to communication systems, and more particularly, to power control techniques in full duplex (FD) systems based on a path loss (PL) reference signal (RS) (PL-RS) for measuring self-interference.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. In examples, the apparatus may be configured to measure self-interference for one or more beam pairs based on one or more PL-RSs; adjust an uplink (UL) transmit (Tx) power for a FD operation based on the self-interference measured for the one or more beam pairs; and transmit an UL transmission for the FD operation based on the adjustment to the UL Tx power.

In another an aspect of the disclosure, a method, a computer-readable medium, and an apparatus are provided. In examples, the apparatus may be configured to configure a PL-RS for one or more beam pairs; schedule a downlink (DL) transmission including the PL-RS configured for the one or more beam pairs, the PL-RS for triggering a self-interference measurement at a user equipment (UE); and receive an UL transmission from the UE, the UL transmission having an UL Tx power that is based on the self-interference measurement triggered by the PL-RS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
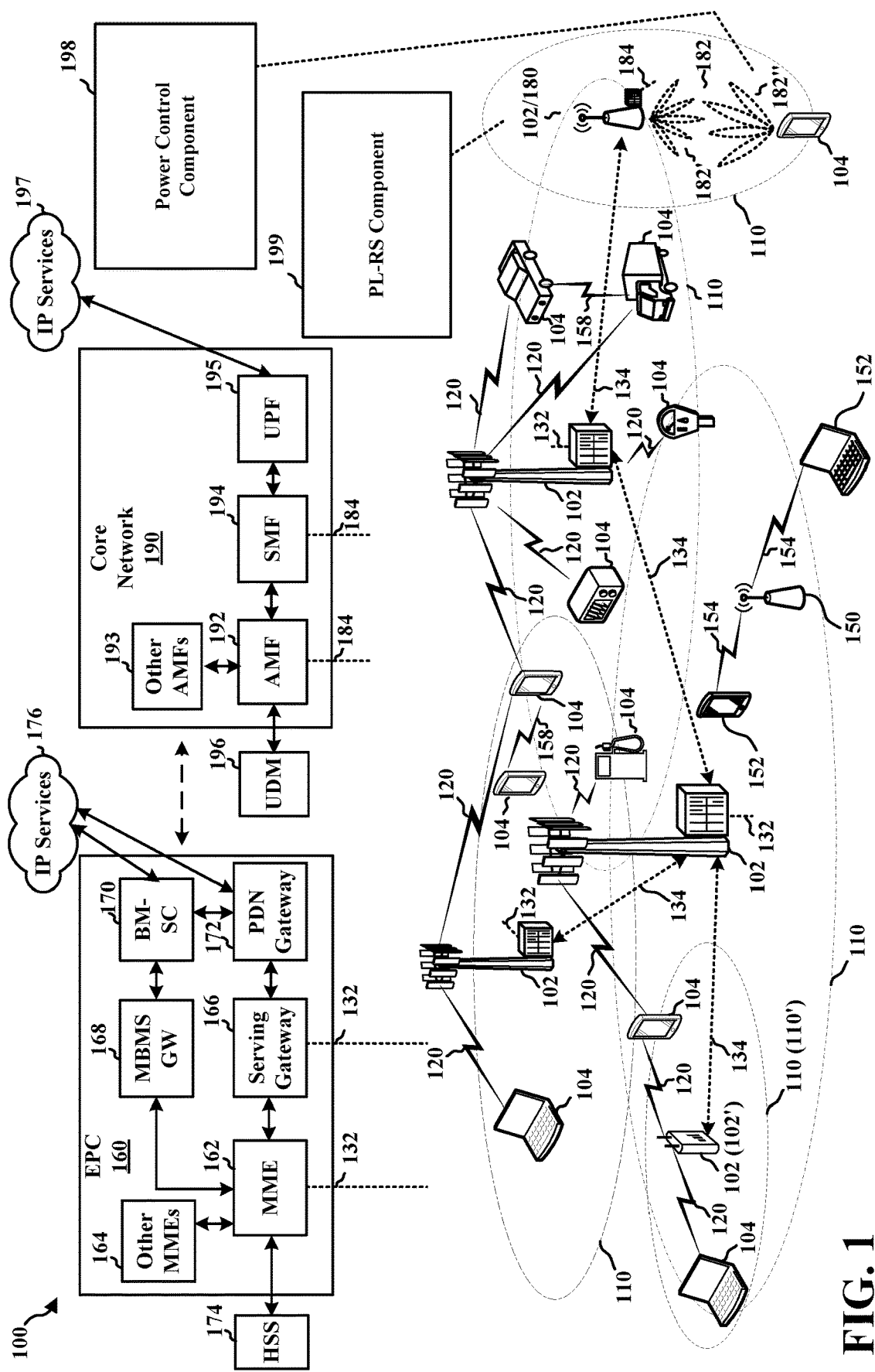
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a power control component 198 configured to measure self-interference for one or more beam pairs based on one or more path loss (PL) reference signals (RSs) (PL-RSs); adjust an UL transmit (Tx) power for a full duplex (FD) operation based on the self-interference measured for the one or more beam pairs; and transmit an UL transmission for the FD operation based on the adjustment to the UL Tx power. In certain aspects, the base station 180 may include a PL-RS component 199 configured to configure a PL-RS for one or more beam pairs; schedule a downlink (DL) transmission including the PL-RS configured for the one or more beam pairs, the PL-RS for triggering a self-interference measurement at a user equipment (UE); and receive an UL transmission from the UE, the UL transmission having an UL Tx power that is based on the self-interference measurement triggered by the PL-RS. Although the following description may be focused on 5G NR, the concepts described herein may be applicable to other similar areas, such as LTE, LTE-A, CDMA, GSM, and other wireless technologies.

Figure 2:
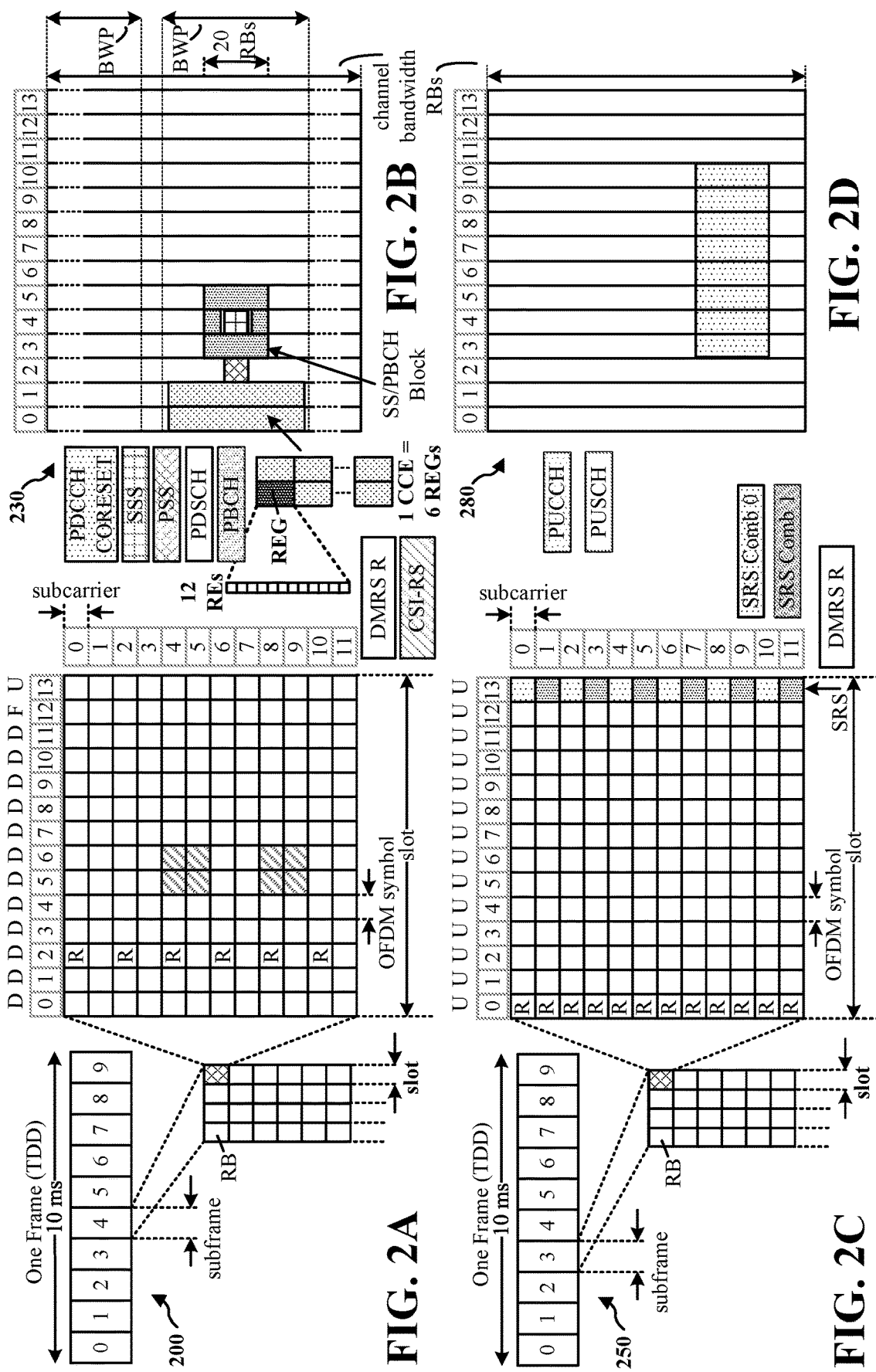
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
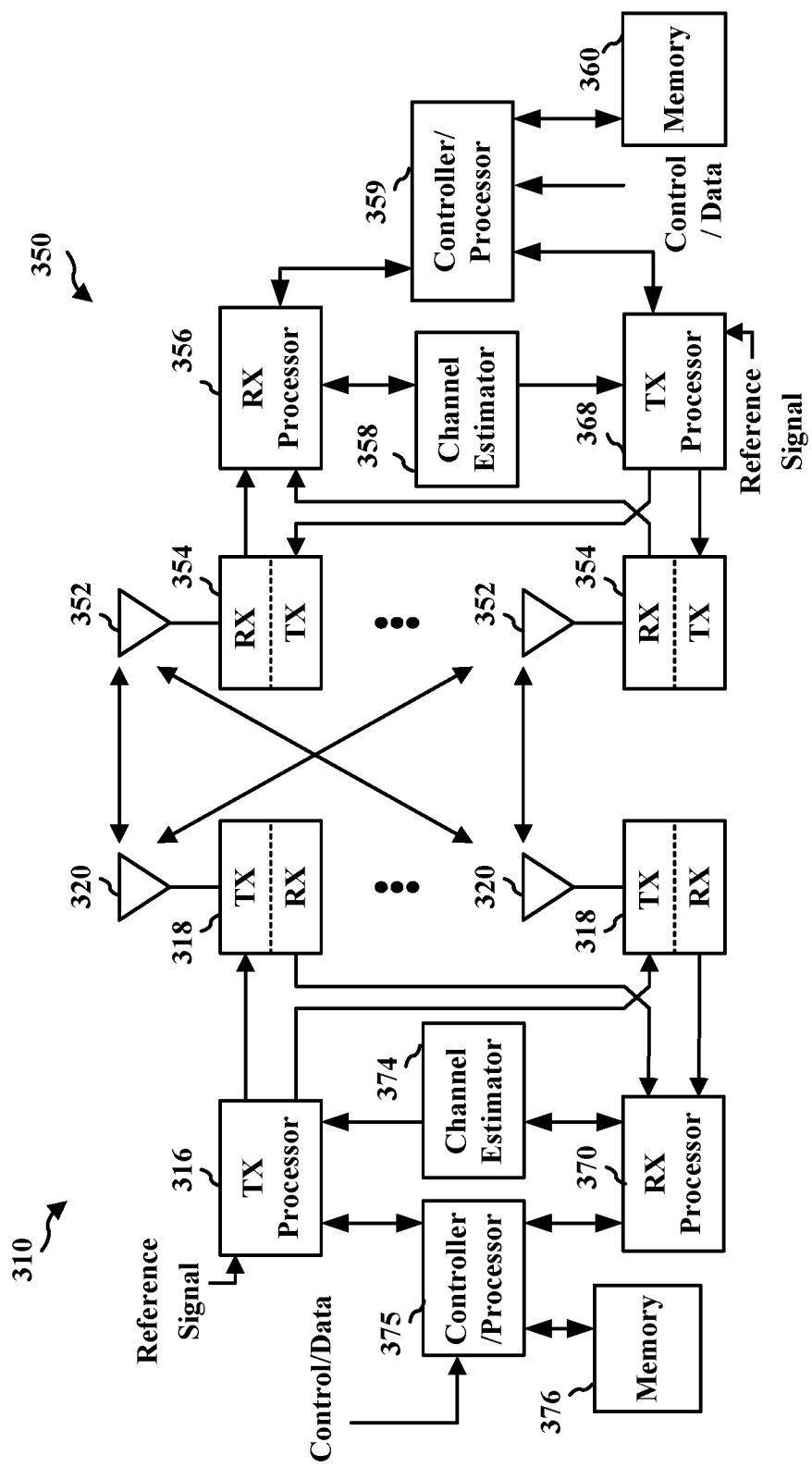
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the power control component 198 of FIG. 1.

At least one of the TX processor 316, the RX processor 370, and the controller/processor 375 may be configured to perform aspects in connection with the PL-RS component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
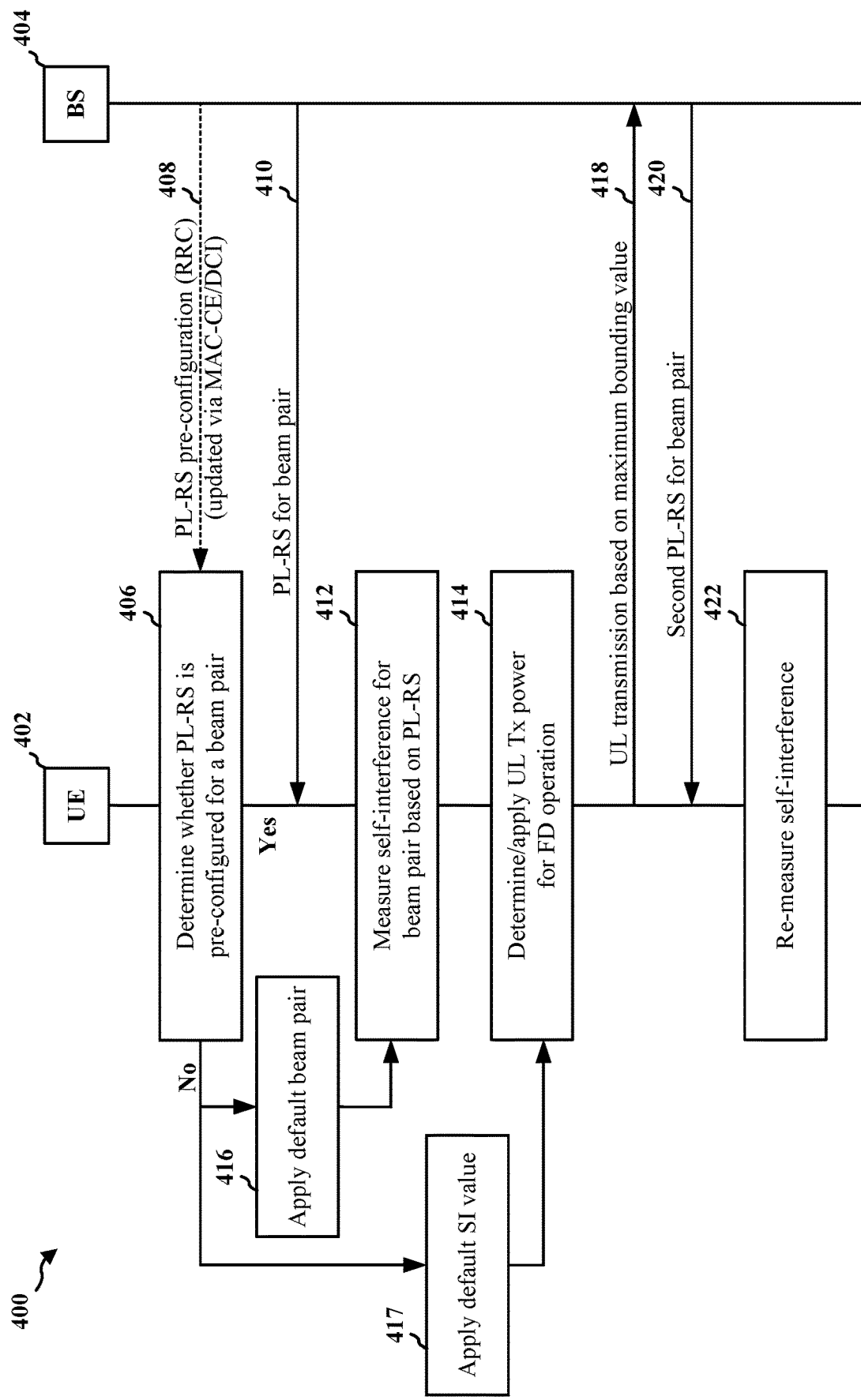
FIG. 4 is a call flow diagram illustrating communications between a UE and a base station.

FIG. 4 is a call flow diagram 400 illustrating communications between a UE 402 and a base station 404. At 406, the UE 402 may determine whether a PL-RS is pre-configured for a beam pair. For example, the base station 404 may pre-configure the PL-RS based on RRC signaling. Further, the base station 404 may update the pre-configuration of the PL-RS via a MAC-control element (MAC-CE) or DCI.

If the UE 402 determines, at 406, that the PL-RS is preconfigured, the UE 402 may receive, at 410, from the base station 404, the PL-RS for the beam pair. Based on the received PL-RS, the UE 402 may measure, at 412, a self-interference for the beam pair. If the UE 402 determines, at 406, that the PL-RS is not pre-configured, the UE 402 may apply, at 416, a default beam pair to measure, at 412, the self-interference for the beam pair. Additionally or alternatively, if the UE 402 determines, at 406, that the PL-RS is not pre-configured, the UE 402 may apply, at 417, a default self-interference (SI) value as the measured self-interference to determine, at 414, an UL Tx power.

At 414, the UE 402 may determine the UL Tx power for a FD operation based on the self-interference measurement, at 412. The UE 402 may also apply, at 414, the UL Tx power during a FD operation. At 418, the UE 402 may transmit an UL transmission to the base station 404 based on the maximum bounding value for the UL Tx power.

In examples, the self-interference measured, at 412, may change over time or may change based on conditions of an environment of the UE 402 (e.g., based on clutter within the environment). Accordingly, further PL-RSs, such as a second PL-RS for the beam pair received, at 420, may be received by the UE 402 periodically from the base station 404. At 422, the UE 402 may re-measure the self-interference based on the second PL-RS for the beam pair received, at 420, from the base station 404.

Figure 5:
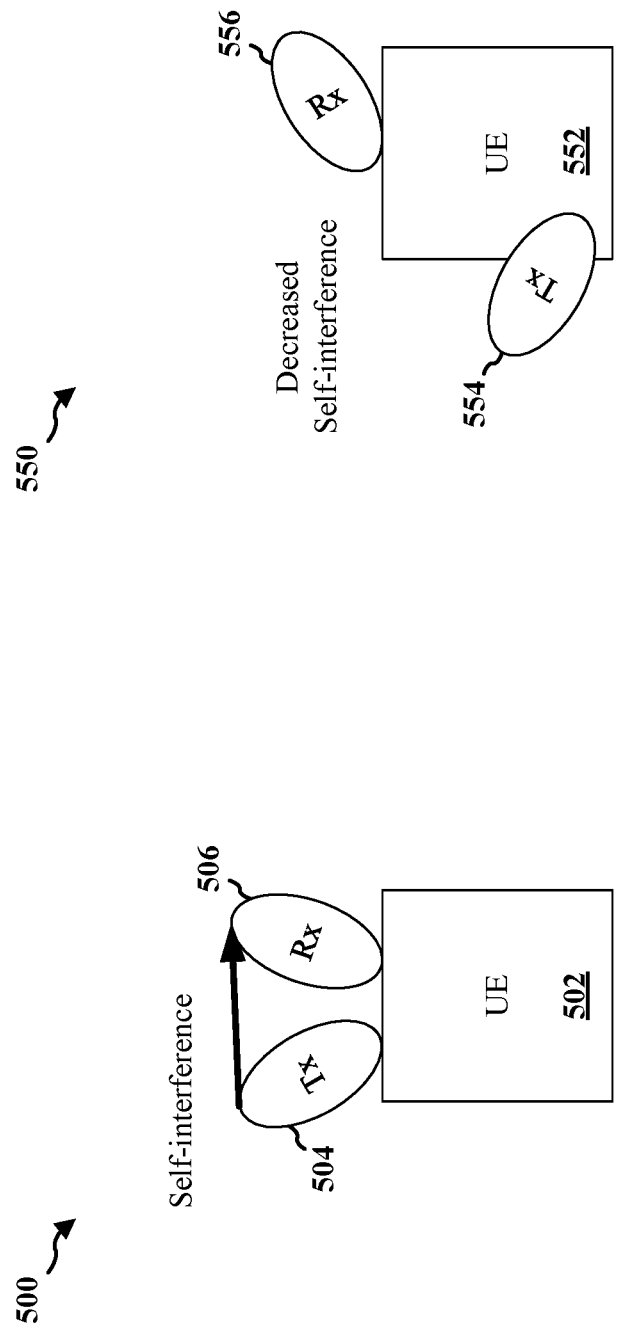
FIGS. 5A-5B are diagrams associated with self-interference at a UE.

FIGS. 5A-5B illustrate diagrams 500-550, respectively, associated with self-interference at a UE 502/552. A PL-RS may be utilized for measuring self-interference from a local transmitter to a local receiver in power control techniques of an FD system. That is, UL power control may be based on a reference signal associated with the self-interference at the UE 502/552. In some configurations, communications may be based on half duplex (HD) systems, where a device (e.g., a UE or a base station) may not transmit a signal and receive a signal at a same time. Thus, HD devices may have half the efficiency of FD devices that transmit and receive signals at the same time. FD devices in cellular systems may have self-interference/leakage from a Tx beam 504 to the local receiver of the UE 502. Given that the local transmitter and the local receiver of the UE 502 may be in close proximity to each other, a strength of the self-interference may be high.

Self-interference caused by a device, such as the UE 502 or a base station, transmitting and receiving signals at the same time may reduce FD operations. In some configurations, the local transmitter may block the local receiver from receiving the Rx beam 506 from another device. In examples, the path loss of the Rx beam 506 may be high, causing the signal transmitted from the other device to be weak. Since the local transmitter may be in proximity to the local receiver, the Tx beam 504 from the UE 502 may be stronger at the UE 502 than the Rx beam 506 from the other device (e.g., base station).

Self-interference from a Tx antenna to an Rx chain may be based on a proximity of the devices (e.g., a proximity of the UE 502 to the base station) and/or from reflections caused by local clutter. The self-interference at the UE 502 may block the Rx beam 506 via the self-interference of the Tx beam 504 being at least as strong as the Rx beam 506 including cancellation techniques. Cancellation, such as analog cancellation or digital cancellation, may not correspond to a same tone (e.g., the Tx beam 504 and the Rx beam 506 may utilize different BWPs to reduce self-interference in FD operations). If the UE 502 determines a channel from the local transmitter to a remote receiver and an estimated strength of the Tx beam 504, an estimated self-interference may be cancelled at the UE 502 based on digital techniques. After cancellation is performed, a remaining portion of the Rx beam 506 may correspond to the signal transmitted from the base station. Analog cancellation techniques may also be performed in an analog domain. Accordingly, if self-interference is cancelled, the UE 502 may double a spectrum efficiency and reduce latency.

In millimeter wave (mmW) applications, self-interference may be decreased by selecting particular beams for an UL/DL beam pair. For example, the UE 552 may utilize beamforming techniques to direct a Tx beam 554 and an Rx beam 556 in different directions for decreasing the self-interference/leakage. The Tx beam 554 and the Rx beam 556 may be associated with different spatial directions and/or different panels. Self-interference may be dependent on the Tx/Rx beam pair selected by the UE 552. For example, if the Tx beam 504 and the Rx beam 506 are associated with a same direction and a same panel, the Tx antenna may have increased leakage to the Rx antenna. Thus, the self-interference at the UE 502 may be higher than when different beam directions and/or different antenna arrays/panels are used by the UE 552 to provide both physical and directional separation. A beam pair may be selected via beam training procedures that utilize a simultaneous CSI-RS/SRS sweep (e.g., a self-interference measurement may be performed to select the beam pair that decreases the self-interference at the UE 552 for the FD operations).

In FD configurations, the UE and the base station may utilize two beam pair links for UL/DL balancing of the signal strength and the self-interference. For power control purposes, if the UL signaling strength is high, leakage to the local receiver during FD operations may also be high (e.g., the UL signaling may be strong enough to block the DL signaling from the base station). Hence, the UL power control may be configured such that the Tx signal is reduced to not block the Rx signal. If the UL beam changes during the FD operations, updated procedures may be performed for receiving the DL beam.

Figure 6:
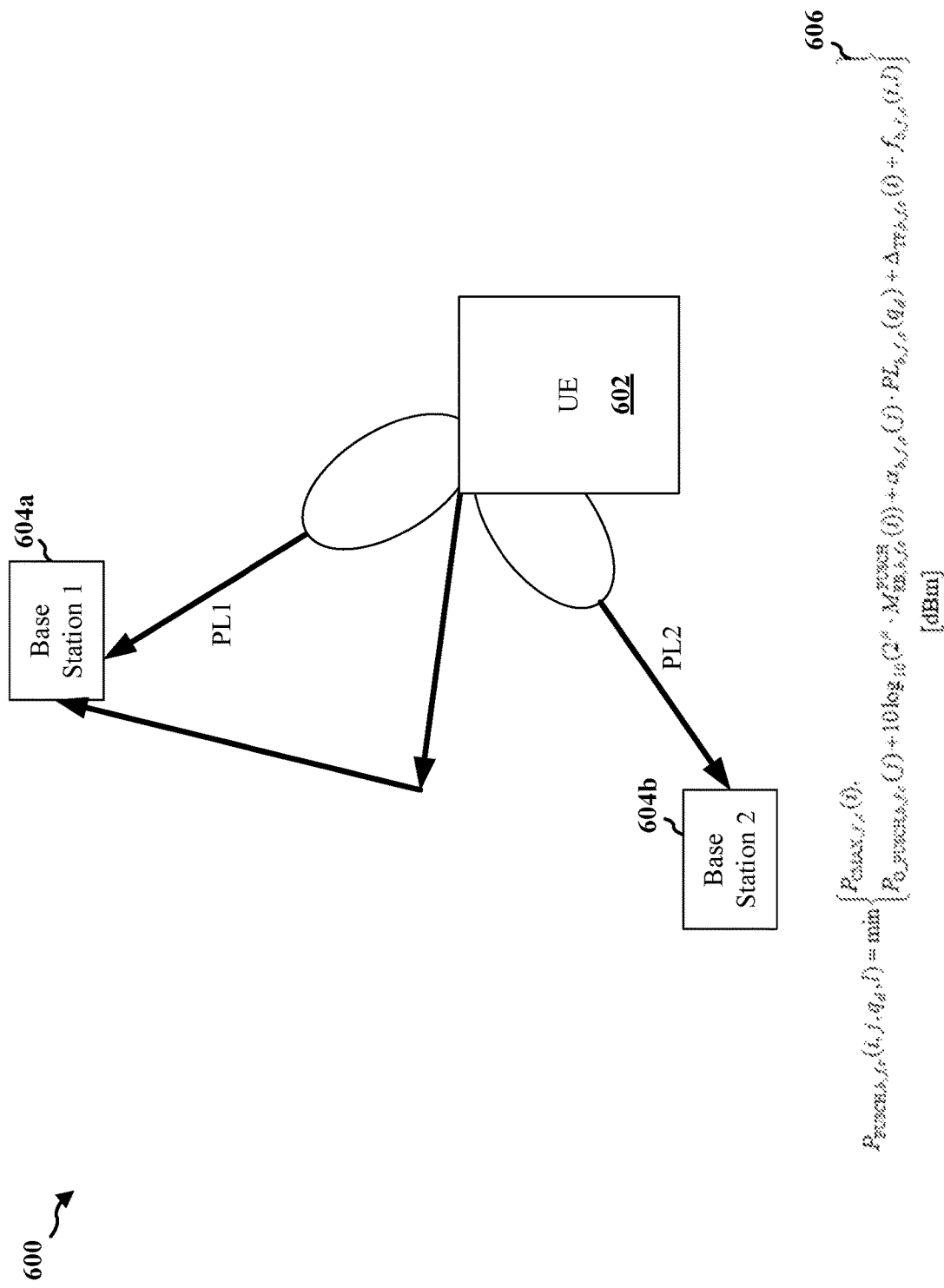
FIG. 6 is a diagram illustrating different path losses (PLs) for different beams of a UE.

FIG. 6 illustrates a diagram 600 corresponding to different PLs for different beams of a UE 602. To measure the self-interference, the UE 602 may select a beam pair for transmitting SRS and receiving CSI-RS. A base station 604a may schedule the SRS and the CSI-RS at the same time scheduled for the transmitter and the receiver of the UE 602. The base station 604a may transmit the CSI-RS and listen for the SRS for measuring the self-interference at the UE 602. Such measurements may be coordinated by the base station 604a. In aspects, DM-RS may be measured in an UL transmission (e.g., PUSCH) to determine the self-interference.

Power control techniques may be used in association with any of a PUSCH, PUCCH, SRS, PRACH, etc. The UE 602 may determine the power for an UL transmission based on a measured PL (e.g., PL1). In some cases, the PL may be estimated for the UL transmission. A power control algorithm 606 for determining the power of the UL transmission (e.g., $P_{PUSCH}$) may be based on a maximum power threshold ($P_{C\_MAX}$), which may be a bounding term that corresponds to a maximum Tx power for the UE 602, as well as $P_O$ and $\alpha$ terms that that correspond to an offset and slope of a PL inversion, respectively. In examples, $P_O$ and $\alpha$ may be configured via RRC signaling based on a $P_O$-pusch-alphaset parameter. The power control algorithm 606 may be further based on a bandwidth (M) for the PUSCH, a $\Delta$ term associated with a modulation and coding scheme (MCS), and a frequency term (f) for adjustments associated with a Tx power control (TPC) command in DCI.

The UL power control may compensate for the PL, so that when signals are transmitted by the UE 602 to different distances, the Rx signals may have approximately the same strength upon being received at the different distances (e.g., at base stations 604a-604b). The PL may be measured in the UL. However, due to power constraints for the UE 602, an UL transmission may not occur if the PL is too high. The $\alpha$ parameter may be indicative of a fraction of the PL that may be compensated (e.g., based on fractional path of composition techniques). Some aspects of the power control algorithm 606 (e.g., a, PL, etc.) may be configured by the base station(s) 604a-604b based on a predefined protocol.

In mmW systems, the PL may be different for different beams. For example, a PL1 corresponding to the base station 604a may be different from a PL2 corresponding to the base station 604b. For the UE 602 to measure the PL, a PL-RS may be provided based on a CSI-RS/SSB. The PL-RS may be a DL RS included in the beam associated with the UL transmission. For instance, if the UE 602 is transmitting in UL to the base station 604a, the DL RS may be transmitted along a same direction back to the UE 602 in a DL channel using the same beam. The CSI-RS/SSB of the beam may be configured as the PL-RS associated with an SRS resource (e.g., based on an SRS resource index (SRI)). The UE 602 may measure the CSI-RS/SSB to determine the PL and apply the corresponding PL information to the power control algorithm 606 to determine/adjust the UL power. When the SRI is used to schedule a PUSCH, the PL that is measured via the associated PL-RS may be used to determine the Tx power. If the PL-RS is not configured, a default beam (e.g., associated with a MIB/SSB) may be utilized. The PL signal may not be configured in cases where, e.g., RRC is being configured. Similar algorithms to the power control algorithm 606 may utilize the measured PL as an input for UL transmissions corresponding to PUCCH and/or SRS.

Figure 7:
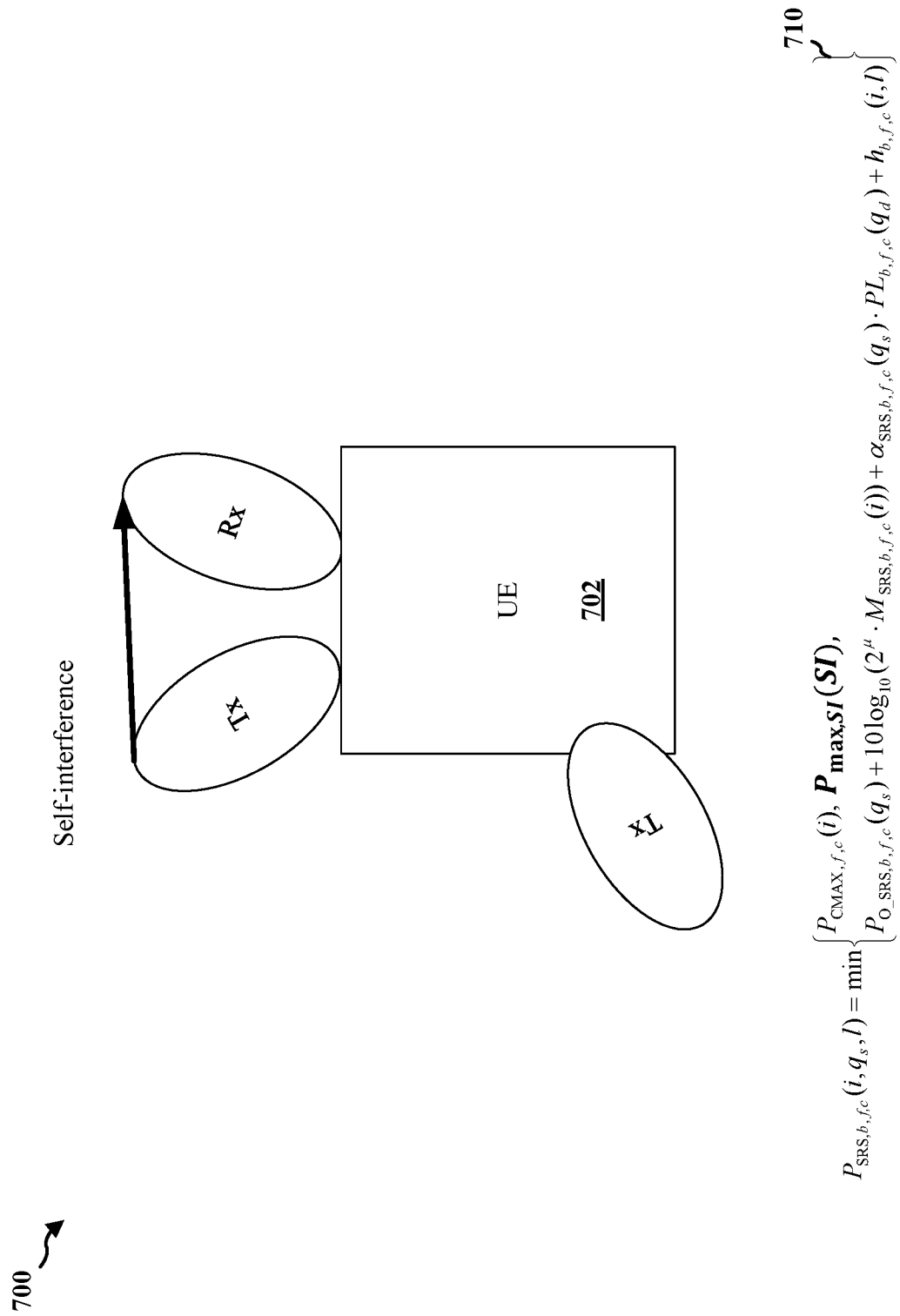
FIG. 7 is a diagram illustrating power control for a full duplex (FD) UE.

FIG. 7 illustrates a diagram 700 for power control in UE 702, e.g., an FD UE. Since leakage may occur from the local transmitter to the local receiver of the UE 702 in association with power control for FD operations, the local transmitter may be configured to transmit a signal with sufficient strength, but not strong enough to block the local receiver. Self-interference at the UE 702 may provide a basis for determining an UL power of a FD transmission, such that a DL reception from a base station does not become blocked. A level of self-interference may be different from beam pair to beam pair. By measuring the self-interference for each beam pair, a maximum UL power may be limited based on the measurement, such that the leakage from the local transmitter to the local receiver is small enough to not block the DL reception from the base station.

Self-interference may change over time and/or environments (e.g., due to clutter, such as objects that reflect UL transmissions into the DL signal received by the UE 702). Hence, self-interference may not be a stable characteristic. The self-interference may be measured from time-to-time for the beam pairs, which may be performed based on measuring a reference signal or a pair of reference signals. Accordingly, to determine the UL power in the FD operation the UE 702 may determine the self-interference but, since the self-interference may change over time, the UE 702 may perform one or more further measurements from time to time. A reference signal may be transmitted for each scheduled beam pair transmission to determine the power control (e.g., to determine a self-interference PL signal that may be similar to an UL PL signal in some cases and use the self-interference PL signal to determine the self-interference, which may be further used to determine the UL power for the FD operation).

A modified power control algorithm 710 may be executed by the UE 702 for FD transmissions. The modified power control algorithm 710 may account for self-interference at the UE 702 caused by the UL transmission. An additional bounding term (e.g., $P_{max,SI}(SI)$) in the modified power control algorithm 710 may be associated with the self-interference and may correspond to an additional maximum power determined based on the self-interference. That is, a value of the self-interference may be used to determine the maximum transmitted power, as the transmitted power multiplied by the PL of the self-interference may be indicative of the interference. $P_{max,SI}(SI)$ and/or $P_{C\_MAX}$ may bound the interference in the DL to ensure that a threshold level of interference does not occur in the DL. Other parameters in the modified power control algorithm 710 may be adjusted based on the self-interference. For example, offset parameters such as the $P_O$ parameter or an h parameter, as well as slope parameters such as $\alpha$, may be selected based on the measured self-interference.

For each FD beam pair link, the network may configure a self-interference PL-RS for power control techniques. A Tx beam and an Rx beam may be transmitted at the same time to form a pair of beams for the FD transmission. For each pair of beams, the network may configure the self-interference PL-RS to determine the self-interference and further determine the power control. The configuration may be provided via RRC signaling and may be updated via a MAC-CE or DCI. The self-interference PL-RS may be associated with at least an UL transmission corresponding to the UL beam in the beam pair and a DL transmission for measuring the self-interference using the DL beam in the beam pair. The UL transmission may be SRS, PUSCH, PUCCH, or PRACH. The DL transmission may be CSI-RS (e.g., zero power CSI-RS or non-zero power CSI-RS), a tracking reference signal (TRS), or a DM-RS (e.g., in a semi-persistent scheduling (SPS) PDSCH/PDCCH). Thus, transmissions in the UL may be measured using a predetermined DL signal. For example, if an SRS is transmitted with zero power, the UE 702 may determine that the entirety of the received signal is self-interference. If the SRS is transmitted with non-zero power, the UE 702 may determine a predefined sequence, such that when the UE 702 receives the signal from the base station (e.g., CSI-RS having the power/sequence), the UE 702 may determine the SRS leakage based on a combination of the transmitted SRS and the received CSI-RS. In examples where the CSI-RS sequence is predetermined, the UE 702 may subtract a contribution of the CSI-RS from the received signal to determine the self-interference based on a remaining portion of the signal. The self-interference PL-RS may be transmitted periodically for the UE 702 to measure the self-interference. The UE 702 may also be configured to monitor for the SRS to determine changes in the self-interference over time.

When a FD transmission is scheduled on a beam pair, the UE 702 may determine a pre-configured self-interference PL-RS associated with the beam pair used for the FD transmission. For example, the UE 702 may first determine the self-interference PL-RS associated with the beam pair and subsequently use the beam pair to determine a measured self-interference value. The self-interference value may be provided as input to the modified power control algorithm 710 to determine the UL power control/UL Tx power of the FD transmission. When the self-interference PL-RS is not configured for the beam pair, the UE 702 may use a default beam pair to measure the self-interference or use a default value for the self-interference in the modified power control algorithm 710 to determine the power control.

Figure 8:
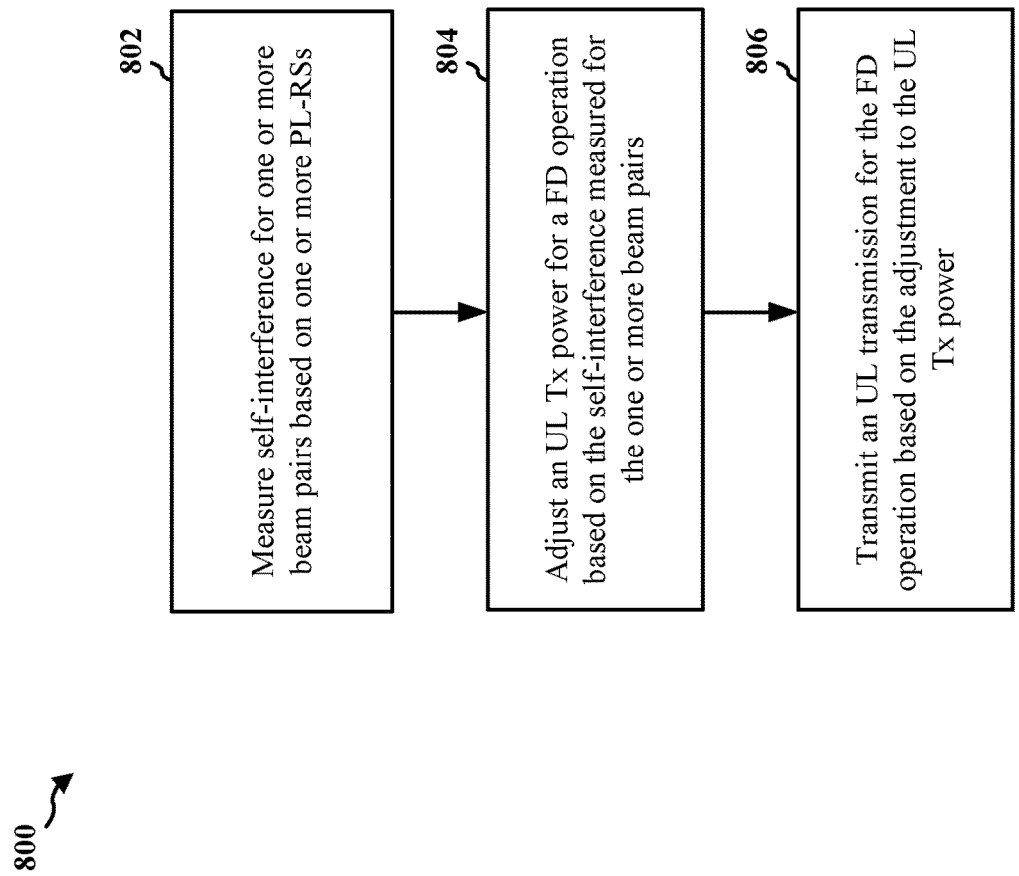
FIG. 8 is a flowchart of a method of wireless communication at a UE.

FIG. 8 is a flowchart 800 of a method of wireless communication. The method may be performed by a UE (e.g., the UE 104, 402, 502, 552, 602, 702; the apparatus 1202; etc.), which may include the memory 360 and which may be the entire UE 104, 402, 502, 552, 602, 702 or a component of the UE 104, 402, 502, 552, 602, 702, such as the TX processor 368, the RX processor 356, and/or the controller/processor 359.

At 802, the UE may measure self-interference for one or more beam pairs based on one or more PL-RSs. For example, referring to FIG. 4, the UE 402 may measure, at 412, the self-interference for the beam pair based on the PL-RS received, at 410, from the base station 404. The measurement, at 802, may be performed by the measurement component 1242 of the apparatus 1202 in FIG. 12.

At 804, the UE may adjust an UL Tx power for a FD operation based on the self-interference measured for the one or more beam pairs. For example, referring to FIG. 4, the UE 402 may apply, at 414, an adjusted UL Tx power for the FD operation based on the self-interference measured, at 412, for the beam pair. The adjustment, at 804, may be performed by the adjustment component 1248 of the apparatus 1202 in FIG. 12.

At 806, the UE may transmit an UL transmission for the FD operation based on the adjustment to the UL Tx power. For example, referring to FIG. 4, the UE 402 may transmit, at 418, an UL transmission to the base station 404 based on a maximum bounding value. The transmission, at 806, may be performed by the transmission component 1234 of the apparatus 1202 in FIG. 12.

Figure 9:
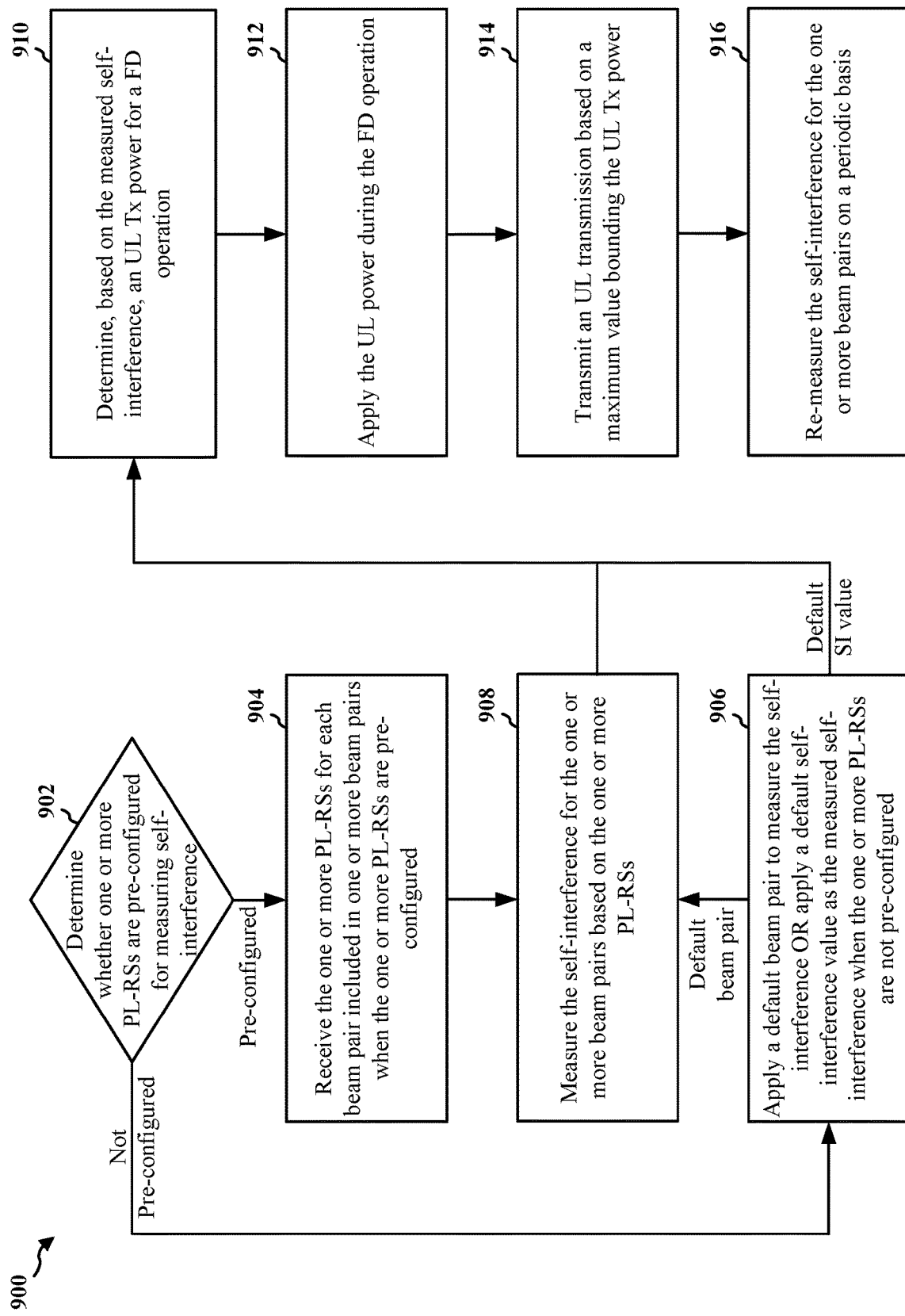
FIG. 9 is a flowchart of a method of wireless communication at a UE.

FIG. 9 is a flowchart 900 of a method of wireless communication. The method may be performed by a UE (e.g., the UE 104, 402, 502, 552, 602, 702; the apparatus 1202; etc.), which may include the memory 360 and which may be the entire UE 104, 402, 502, 552, 602, 702 or a component of the UE 104, 402, 502, 552, 602, 702, such as the TX processor 368, the RX processor 356, and/or the controller/processor 359.

At 902, the UE may determine whether one or more PL-RSs are pre-configured for measuring self-interference. For example, referring to FIG. 4, the UE 402 may determine, at 406, whether a PL-RS is pre-configured for a beam pair associated with the base station 404. The one or more PL-RSs may be pre-configured (e.g., at 408) via RRC signaling and the one or more PL-RSs may be updated (e.g., at 408) in association with at least one of a MAC-CE or DCI. The one or more PL-RSs may be associated with an UL transmission and a DL reception (e.g., beam pair). The UL transmission may correspond to an UL beam in the one or more beam pairs and the DL reception may correspond to a DL beam in the one or more beam pairs. The UL transmission may be at least one of a SRS, a PUSCH, a PUCCH, or a physical random access channel (PRACH). The DL reception may be at least one of a CSI-RS, a TRS, or a DM-RS. The determination, at 902, may be performed by the determination component 1240 of the apparatus 1202 in FIG. 12.

At 904, the UE may receive the one or more PL-RSs for each beam pair included in one or more beam pairs when the one or more PL-RSs are pre-configured. For example, referring to FIG. 4, the UE 402 may receive, at 410, PL-RS for the beam pair when the PL-RSs is pre-configured, at 408, by the base station 404. The reception, at 904, may be performed by the reception component 1230 of the apparatus 1202 in FIG. 12.

At 906, the UE may apply a default beam pair to measure the self-interference when the one or more PL-RSs are not pre-configured or the UE may apply a default self-interference value as the measured self-interference when the one or more PL-RSs are not pre-configured. For example, referring to FIG. 4, when the PL-RS is determined, at 406, to not be pre-configured, the UE 402 may apply, at 416, a default beam pair for measuring the self-interference, at 412. Additionally or alternatively, when the PL-RS is determined, at 406, to not be pre-configured, the UE 402 may apply, at 417, a default self-interference value as the measured self-interference to determine/apply, at 414, the UL Tx power. The application, at 906, may be performed by the application component 1244 of the apparatus 1202 in FIG. 12.

At 908, the UE may measure the self-interference for the one or more beam pairs based on the one or more PL-RSs. For example, referring to FIG. 4, the UE 402 may measure, at 412, the self-interference for the beam pair based on the PL-RS received, at 410, from the base station 404. The measurement, at 908, may be performed by the measurement component 1242 of the apparatus 1202 in FIG. 12.

At 910, the UE may determine, based on the measured self-interference or the default self-interference value applied as the measured self-interference, an UL Tx power for a FD operation. For example, referring to FIG. 4, the UE 402 may determine, at 414, an UL Tx power for a FD operation based on the self-interference measured, at 412. The UL Tx power may be determined, at 414, based on a predefined algorithm, where at least one parameter in the predefined algorithm may be dependent on the measured self-interference (e.g., at 412). The determination, at 910, may be performed by the determination component 1240 of the apparatus 1202 in FIG. 12.

At 912, the UE may apply the UL Tx power during the FD operation. For example, referring to FIG. 4, the UE 402 may apply, at 414, the UL Tx power for an FD operation. The application, at 912, may be performed by the application component 1244 of the apparatus 1202 in FIG. 12.

At 914, the UE may transmit an UL transmission based on a maximum value bounding the UL Tx power. For example, referring to FIG. 4, the UE 402 may transmit, at 418, the UL transmission based on a maximum bounding value for the UL Tx power. In examples, the maximum value bounding the UL Tx power may be determined based on the measured self-interference (e.g., at 412). The transmission, at 914, may be performed by the transmission component 1234 of the apparatus 1202 in FIG. 12.

At 916, the UE may re-measure the self-interference for the one or more beam pairs on a periodic basis. For example, referring to FIG. 4, the UE 402 may re-measure the self-interference, at 422, based on a second PL-RS received from the base station 404, at 420, as the self-interference may change based on at least one of a time period or an environment. In examples, a level of the self-interference may be different for different beam pairs included in the one or more beam pairs. The re-measurement, at 916, may be performed by the re-measurement component 1246 of the apparatus 1202 in FIG. 12.

Figure 10:
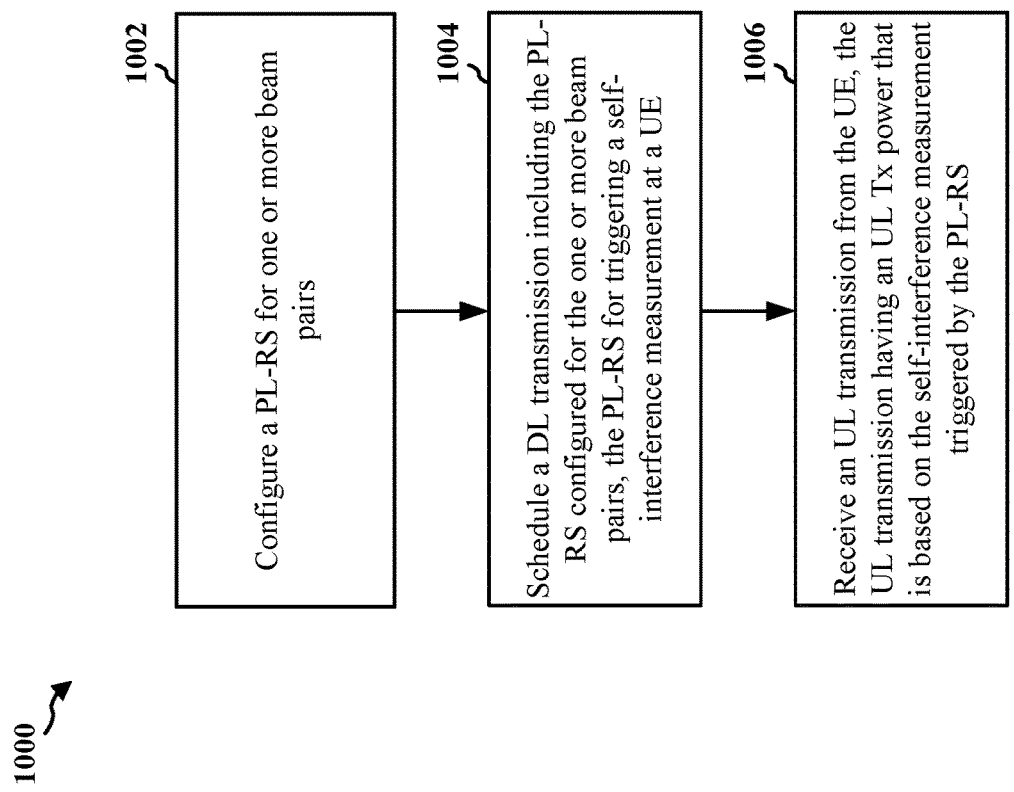
FIG. 10 is a flowchart of a method of wireless communication at a base station.

FIG. 10 is a flowchart 1000 of a method of wireless communication. The method may be performed by a base station, e.g., the base station 102, 180, 404, 604a, 604b; the apparatus 1302; etc.), which may include the memory 376 and which may be the entire base station 102, 180, 404, 604a, 604b or a component of the base station 102, 180, 404, 604a, 604b, such as the TX processor 316, the RX processor 370, and/or the controller/processor 375.

At 1002, the base station may configure a PL-RS for one or more beam pairs. For example, referring to FIG. 4, the base station 404 may perform, at 408, a PL-RS pre-configuration. The configuration, at 1002, may be performed by the configuration component 1340 of the apparatus 1302 in FIG. 13.

At 1004, the base station may schedule a DL transmission including the PL-RS configured for the one or more beam pairs, the PL-RS for triggering a self-interference measurement at a UE. For example, referring to FIG. 4, the base station 404 may schedule the PL-RS for the beam pair, at 410, for the UE 402 to measure, at 412, the self-interference for the beam pair based on the PL-RS. The scheduling, at 1004, may be performed by the scheduler component 1342 of the apparatus 1302 in FIG. 13.

At 1006, the base station may receive an UL transmission from the UE, the UL transmission having an UL Tx power that is based on the self-interference measurement triggered by the PL-RS. For example, referring to FIG. 4, the base station 404 may receive, at 418, an UL transmission from the UE 402 having an UL Tx power that is dependent upon the PL-RS transmitted, at 410, to the UE 402. The reception, at 1006, may be performed by the reception component 1330 of the apparatus 1302 in FIG. 13.

Figure 11:
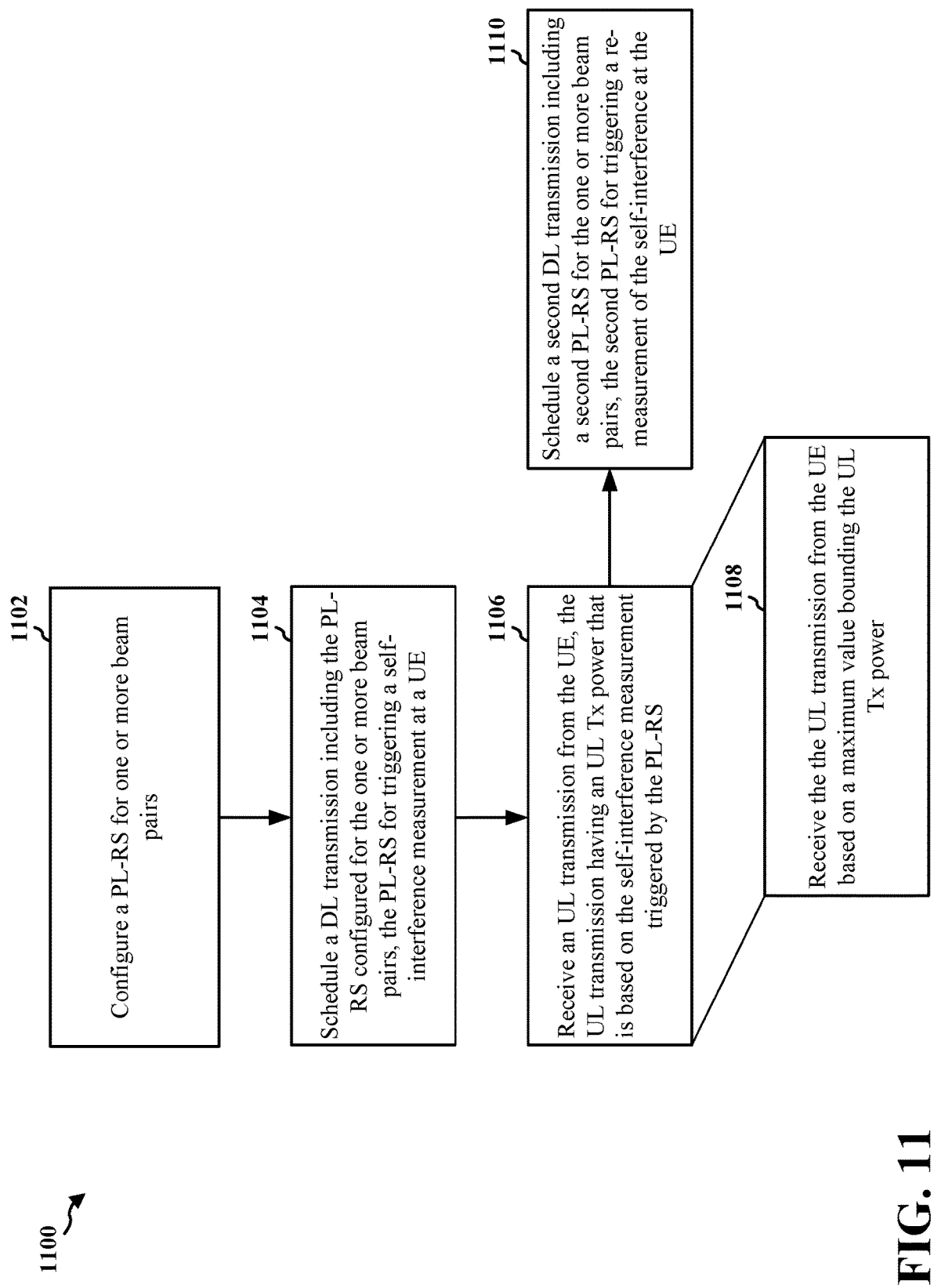
FIG. 11 is a flowchart of a method of wireless communication at a base station.

FIG. 11 is a flowchart 1100 of a method of wireless communication. The method may be performed by a base station, e.g., the base station 102, 180, 404, 604a, 604b; the apparatus 1302; etc.), which may include the memory 376 and which may be the entire base station 102, 180, 404, 604a, 604b or a component of the base station 102, 180, 404, 604a, 604b, such as the TX processor 316, the RX processor 370, and/or the controller/processor 375.

At 1102, the base station may configure a PL-RS for one or more beam pairs. For example, referring to FIG. 4, the base station 404 may perform, at 408, a PL-RS pre-configuration. The PL-RS may be configured (e.g., at 408) via RRC signaling and the PL-RS may be updated (e.g., at 408) in association with at least one of a MAC-CE or DCI. The PL-RS may be associated with an UL beam in the one or more beam pairs and a DL beam in the one or more beam pairs. The UL beam may be at least one of a SRS, a PUSCH, a PUCCH, or a PRACH. The DL beam may be at least one of a CSI-RS, a TRS, or a DM-RS. The configuration, at 1102, may be performed by the configuration component 1340 of the apparatus 1302 in FIG. 13.

At 1104, the base station may schedule a DL transmission including the PL-RS configured for the one or more beam pairs, the PL-RS for triggering a self-interference measurement at a UE. For example, referring to FIG. 4, the base station 404 may schedule the PL-RS for the beam pair, at 410, for the UE 402 to measure, at 412, the self-interference for the beam pair based on the PL-RS. Levels of the self-interference may change based on at least one of a time period or an environment. Further, different beam pairs in the one or more beam pairs may correspond to the different levels of the self-interference. The scheduling, at 1104, may be performed by the scheduler component 1342 of the apparatus 1302 in FIG. 13.

At 1106, the base station may receive an UL transmission from the UE, the UL transmission having an UL Tx power that is based on the self-interference measurement triggered by the PL-RS. For example, referring to FIG. 4, the base station 404 may receive, at 418, an UL transmission from the UE 402 having an UL Tx power that is dependent upon the PL-RS transmitted, at 410, to the UE 402. For example, the UL Tx power may be based on a predefined algorithm, where at least one parameter in the predefined algorithm may be dependent on the self-interference measurement triggered by the PL-RS. The reception, at 1106, may be performed by the reception component 1330 of the apparatus 1302 in FIG. 13.

At 1108, for receiving the UL transmission from the UE, the base station may receive the UL transmission based on a maximum value bounding the UL Tx power. For example, referring to FIG. 4, the base station 404 may receive, 418, the UL transmission based on a maximum bounding value. The maximum value may be configured to bound the UL Tx power based on the self-interference measurement triggered by the PL-RS. The reception, at 1108, may be performed by the reception component 1330 of the apparatus 1302 in FIG. 13.

At 1110, the base station may schedule a second DL transmission including a second PL-RS for the one or more beam pairs, the second PL-RS for triggering a re-measurement of the self-interference at the UE. For example, referring to FIG. 4, the base station 404 may schedule, at 420, a second PL-RS for the beam pair. The second PL-RS scheduled, at 420, may trigger re-measurement, at 422, of the self-interference at the UE 402. The scheduling, at 1110, may be performed by the scheduler component 1342 of the apparatus 1302 in FIG. 13.

Figure 12:
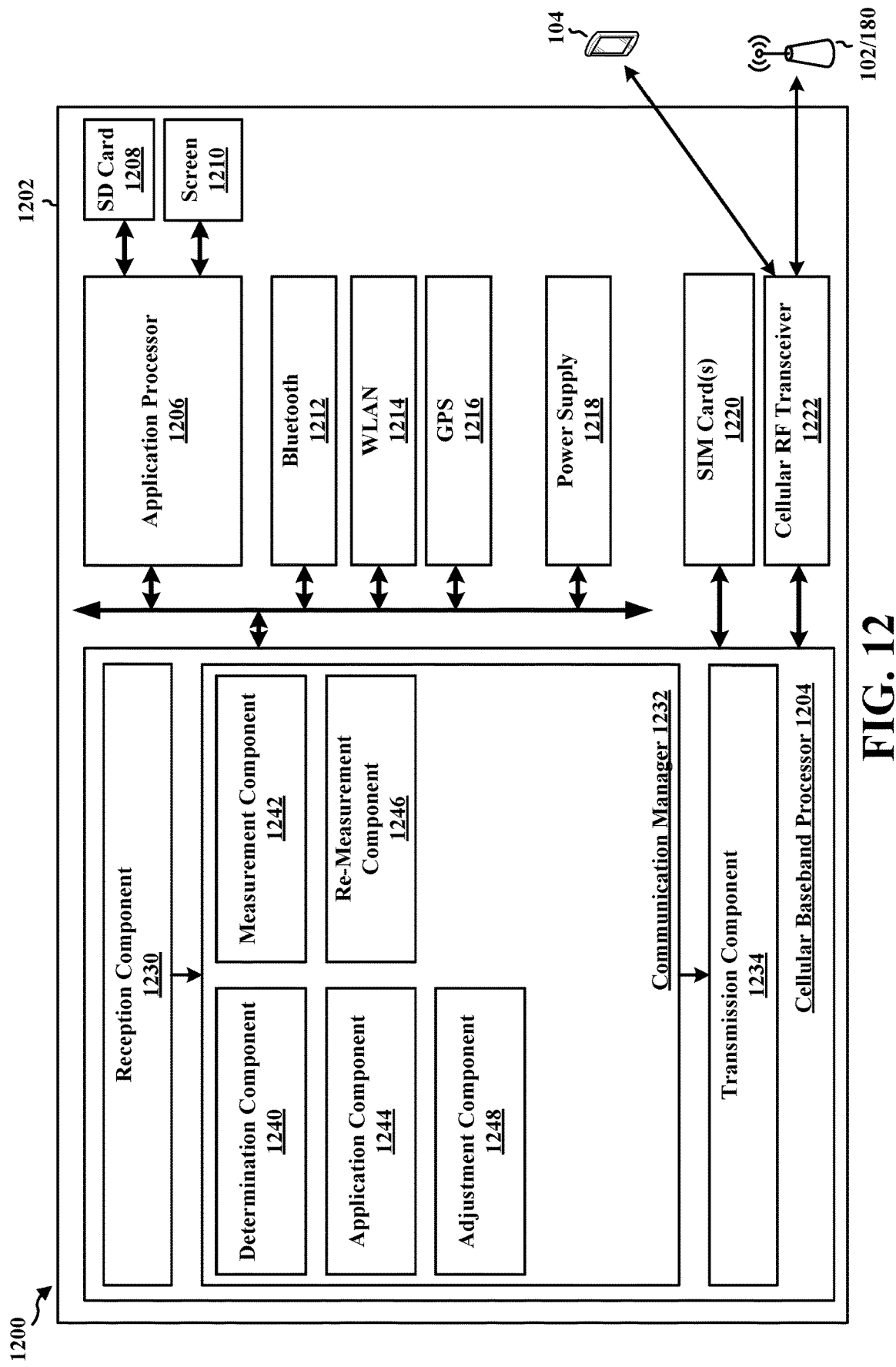
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/ memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/ processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The reception component 1230 is configured, e.g., as described in connection with 904, to receive the one or more PL-RSs for each beam pair included in one or more beam pairs when the one or more PL-RSs are pre-configured. The communication manager 1232 includes a determination component 1240 that is configured, e.g., as described in connection with 902 and 910, to determine whether one or more PL-RSs are pre-configured for measuring self-interference; and to determine, based on the measured self-interference, an UL Tx power for a FD operation. The communication manager 1232 further includes a measurement component 1242 that is configured, e.g., as described in connection with 802 and 908, to measure the self-interference for the one or more beam pairs based on the one or more PL-RSs. The communication manager 1232 further includes an application component 1244 that is configured, e.g., as described in connection with 906 and 912, to apply a default beam pair to measure the self-interference when the one or more PL-RSs are not pre-configured; to apply a default self-interference value as the measured self-interference when the one or more PL-RSs are not pre-configured; and to apply the UL Tx power during the FD operation. The communication manager 1232 further includes a re-measurement component 1246 that is configured, e.g., as described in connection with 916, to re-measure the self-interference for the one or more beam pairs on a periodic basis. The communication manager 1232 further includes an adjustment component 1248 that is configured, e.g., as described in connection with 804, to adjust an UL Tx power for a FD operation based on the self-interference measured for the one or more beam pairs. The transmission component 1234 is configured, e.g., as described in connection with 806 and 914, to transmit an UL transmission for the FD operation based on the adjustment to the UL Tx power; and to transmit an UL transmission based on the maximum value bounding the UL Tx power.

The apparatus may include additional components that perform each of the blocks of the algorithm in the aforementioned flowcharts of FIGS. 8-9. As such, each block in the aforementioned flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for measuring a self-interference for one or more beam pairs based on one or more PL-RSs; means for determining, based on the measured self-interference, an UL Tx power for a FD operation; and means for applying the UL Tx power during the FD operation. The apparatus 1202 further includes means for transmitting an UL transmission based on the maximum value bounding the UL Tx power. The apparatus 1202 further includes means for re-measuring the self-interference for the one or more beam pairs on a periodic basis. The apparatus 1202 further includes means for determining whether the one or more PL-RSs are pre-configured, where the self-interference is measured based on the pre-configuration of the one or more PL-RSs. The apparatus 1202 further includes means for applying a default beam pair to measure the self-interference when the one or more PL-RSs are not pre-configured. The apparatus 1202 further includes means for applying a default self-interference value as the measured self-interference when the one or more PL-RSs are not pre-configured. The apparatus 1202 further includes means for receiving the one or more PL-RSs for each beam pair included in the one or more beam pairs when the one or more PL-RSs are pre-configured. The apparatus 1202 further includes means for measuring self-interference for one or more beam pairs based on one or more PL-RSs; means for adjusting an UL Tx power for a FD operation based on the self-interference measured for the one or more beam pairs; and means for transmitting an UL transmission for the FD operation based on the adjustment to the UL Tx power.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
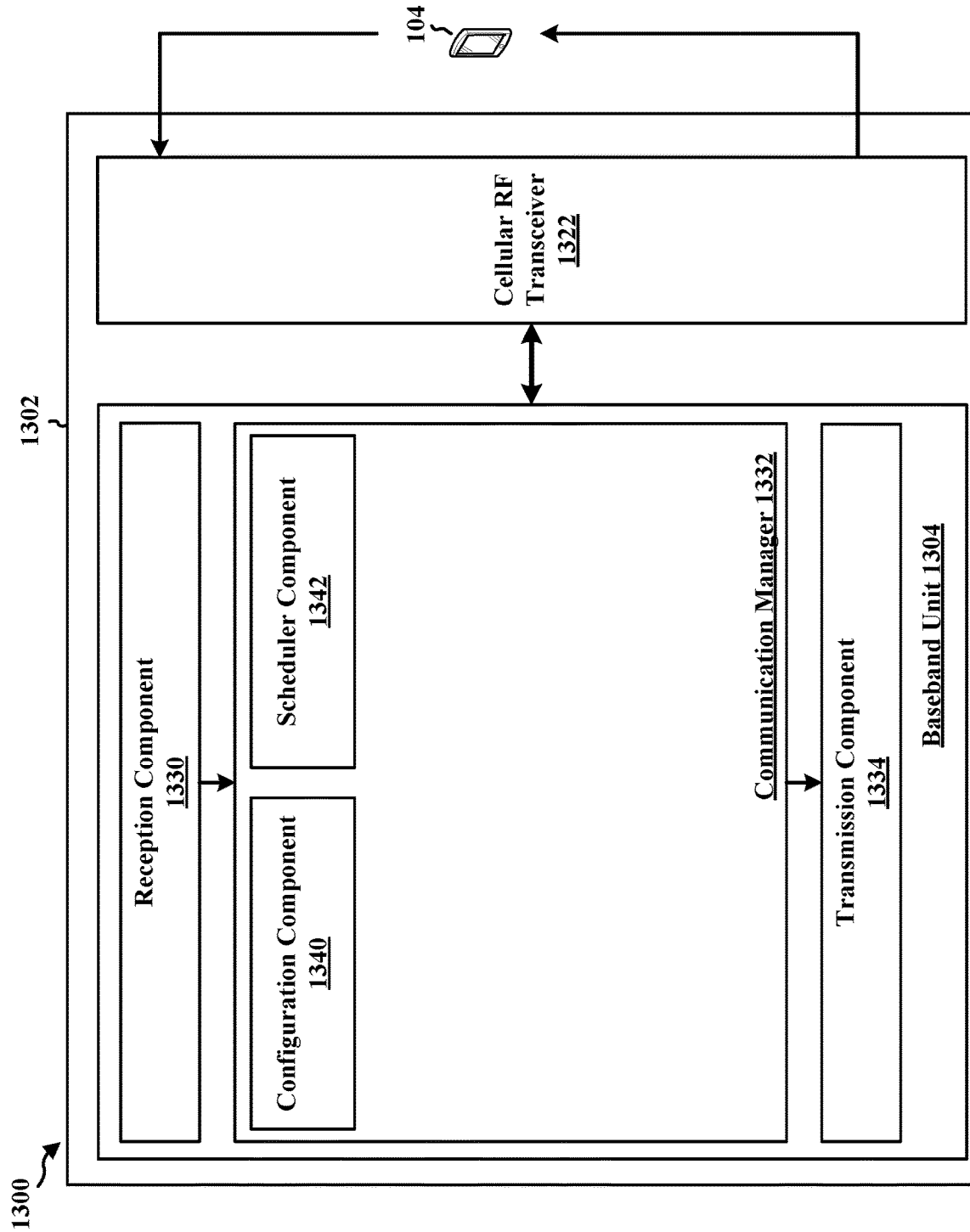
FIG. 13 is a diagram illustrating an example of a hardware implementation for an example apparatus.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The reception component 1330 is configured, e.g., as described in connection with 1006, 1106, and 1108, to receive an UL transmission from the UE, the UL transmission having an UL Tx power that is based on the self-interference measurement triggered by the PL-RS; and to receive the UL transmission from the UE based on a maximum value bounding the UL Tx power. The communication manager 1332 includes a configuration component 1340 that is configured, e.g., as described in connection with 1002 and 1102, to configure a PL-RS for one or more beam pairs. The communication manager 1332 further includes a scheduler component 1342 that is configured, e.g., as described in connection with 1004, 1104 and 1110, to schedule a DL transmission including the PL-RS configured for the one or more beam pairs, the PL-RS for triggering a self-interference measurement at a UE; and to schedule a second DL transmission including a second PL-RS for the one or more beam pairs, the second PL-RS for triggering a re-measurement of the self-interference at the UE.

The apparatus may include additional components that perform each of the blocks of the algorithm in the aforementioned flowcharts of FIGS. 10-11. As such, each block in the aforementioned flowcharts of FIGS. 10-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for configuring a PL-RS for one or more beam pairs; means for scheduling a DL transmission including the PL-RS configured for the one or more beam pairs, the PL-RS for triggering a self-interference measurement at a UE; and means for receiving an UL transmission from the UE, the UL transmission having an UL Tx power that is based on the self-interference measurement triggered by the PL-RS. The apparatus 1302 further includes means for receiving the UL transmission based on the maximum value bounding the UL Tx power. The apparatus 1302 further includes means for scheduling a second DL transmission including a second PL-RS for the one or more beam pairs, the second PL-RS for triggering a re-measurement of the self-interference at the UE. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to measure self-interference for one or more beam pairs based on one or more PL-RSs; adjust an UL Tx power for a FD operation based on the self-interference measured for the one or more beam pairs; and transmit an UL transmission for the FD operation based on the adjustment to the UL Tx power.

Aspect 2 may be combined with aspect 1 and includes that the UL Tx power is based on a predefined algorithm, at least one parameter in the predefined algorithm being dependent on the measured self-interference.

Aspect 3 may be combined with any of aspects 1-2 and includes that a maximum value bounding the UL Tx power is based on the measured self-interference.

Aspect 4 may be combined with any of aspects 1-3 and includes that the at least one processor is further configured to transmit the UL transmission based on the maximum value bounding the UL Tx power.

Aspect 5 may be combined with any of aspects 1-4 and includes that a level of the self-interference is different for different beam pairs included in the one or more beam pairs.

Aspect 6 may be combined with any of aspects 1-5 and includes that the self-interference changes based on at least one of a time period or an environment.

Aspect 7 may be combined with any of aspects 1-6 and includes that the at least one processor is further configured to re-measure the self-interference for the one or more beam pairs on a periodic basis.

Aspect 8 may be combined with any of aspects 1-7 and includes that the at least one processor is further configured to indicate whether the one or more PL-RSs are pre-configured, and where the self-interference is measured based on the pre-configuration of the one or more PL-RSs.

Aspect 9 may be combined with any of aspects 1-8 and includes that the at least one processor is further configured to apply a default beam pair to measure the self-interference when the one or more PL-RSs are not pre-configured.

Aspect 10 may be combined with any of aspects 1-9 and includes that the at least one processor is further configured to apply a default self-interference value as the measured self-interference when the one or more PL-RSs are not pre-configured.

Aspect 11 may be combined with any of aspects 1-10 and includes that the at least one processor is further configured to receive the one or more PL-RSs for each beam pair included in the one or more beam pairs when the one or more PL-RSs are pre-configured.

Aspect 12 may be combined with any of aspects 1-11 and includes that the one or more PL-RSs are pre-configured via RRC signaling, and where the one or more PL-RSs are updated in association with at least one of a MAC-CE or DCI.

Aspect 13 may be combined with any of aspects 1-12 and includes that the one or more PL-RSs are associated with the UL transmission and a DL reception, the UL transmission corresponding to an UL beam in the one or more beam pairs, the DL reception corresponding to a DL beam in the one or more beam pairs.

Aspect 14 may be combined with any of aspects 1-13 and includes that the UL transmission is at least one of an SRS, a PUSCH, a PUCCH, or a PRACH.

Aspect 15 may be combined with any of aspects 1-14 and includes that the DL reception is at least one of a CSI-RS, a TRS, or a DM-RS.

Aspect 16 may be combined with any of aspects 1-15 and further includes at least one of a transceiver or an antenna coupled to the at least one processor.

Aspect 17 is an apparatus for wireless communication at a base station including at least one processor coupled to a memory and configured to configure a PL-RS for one or more beam pairs; schedule a DL transmission including the PL-RS configured for the one or more beam pairs, the PL-RS for triggering a self-interference measurement at a UE; and receive an UL transmission from the UE, the UL transmission having an UL Tx power that is based on the self-interference measurement triggered by the PL-RS.

Aspect 18 may be combined with aspect 17 and includes that the UL Tx power is based on a predefined algorithm, at least one parameter in the predefined algorithm being dependent on the self-interference measurement triggered by the PL-RS.

Aspect 19 may be combined with any of aspects 17-18 and includes that a maximum value bounding the UL Tx power is based on the self-interference measurement triggered by the PL-RS.

Aspect 20 may be combined with any of aspects 17-19 and includes that to receive the UL transmission from the UE the at least one processor is further configured to receive the UL transmission based on the maximum value bounding the UL Tx power.

Aspect 21 may be combined with any of aspects 17-20 and includes that different beam pairs in the one or more beam pairs correspond to different levels of self-interference.

Aspect 22 may be combined with any of aspects 17-21 and includes that the levels of self-interference change based on at least one of a time period or an environment.

Aspect 23 may be combined with any of aspects 17-22 and includes that the at least one processor is further configured to schedule a second DL transmission including a second PL-RS for the one or more beam pairs, the second PL-RS for triggering a re-measurement of self-interference at the UE.

Aspect 24 may be combined with any of aspects 17-23 and includes that the PL-RS is configured via RRC signaling, and where the PL-RS is updated in association with at least one of a MAC-CE or DCI.

Aspect 25 may be combined with any of aspects 17-24 and includes that the PL-RS is associated with an UL beam in the one or more beam pairs and a DL beam in the one or more beam pairs.

Aspect 26 may be combined with any of aspects 17-25 and includes that the UL beam is at least one of an SRS, a PUSCH, a PUCCH, or a PRACH.

Aspect 27 may be combined with any of aspects 17-26 and includes that the DL beam is at least one of a CSI-RS, a TRS, or a DM-RS.

Aspect 28 may be combined with any of aspects 17-27 and further includes at least one of a transceiver or an antenna coupled to the at least one processor.

Aspect 29 is a method of wireless communication for implementing any of aspects 1-28.

Aspect 30 is an apparatus for wireless communication including means for implementing any of aspects 1-28.

Aspect 31 is a computer-readable medium storing computer executable code, the code when executed by at least one processor causes the at least one processor to implement any of aspects 1-28.

What is claimed is:

1. An apparatus for wireless communication at a user equipment (UE), comprising memory, and one or more processors coupled to the memory, wherein the one or more processors are configured to:
   measure self-interference for one or more beam pairs based on one or more path loss (PL) reference signals (RSs) (PL-RSs), wherein a default self-interference value is the measured self-interference;
   adjust an uplink (UL) transmit (Tx) power for a full duplex (FD) operation based on the self-interference measured for the one or more beam pairs; and
   transmit an UL transmission for the FD operation based on the adjustment to the UL Tx power,
   wherein a first maximum value bounding the UL Tx power is based on the measured self-interference and a second maximum value bounding the UL Tx power, different than the first maximum value, corresponds to a maximum Tx power of the UE, and wherein the first maximum value bounding the UL Tx power is based on a threshold level of self-interference, and
   wherein the one or more processors are further configured to:
     select, for power control and based on the measured self-interference, a power offset, an alpha parameter associated with a slope inversion, and an additional offset; and
     transmit the UL transmission based on the first maximum value bounding the UL Tx power and the power control.

2. The apparatus of claim 1, wherein the UL Tx power is based on a predefined algorithm, at least one parameter in the predefined algorithm being dependent on the measured self-interference.

3. The apparatus of claim 1, wherein a level of the self-interference is different for different beam pairs included in the one or more beam pairs.

4. The apparatus of claim 1, wherein the self-interference for the one or more beam pairs changes based on at least one of a time period or an environment.

5. The apparatus of claim 4, wherein the one or more processors are further configured to re-measure the self-interference for the one or more beam pairs on a periodic basis.

6. An apparatus for wireless communication at a user equipment (UE), comprising memory, and one or more processors coupled to the memory, wherein the one or more processors are configured to:
   measure self-interference for one or more beam pairs based on a pre-configuration one or more path loss (PL) reference signals (RSs) (PL-RSs), wherein a default self-interference value is the measured self-interference;
   adjust an uplink (UL) transmit (Tx) power for a full duplex (FD) operation based on the self-interference measured for the one or more beam pairs; and
   transmit an UL transmission for the FD operation based on the adjustment to the UL Tx power,
   wherein the one or more processors are further configured to:
     determine whether the one or more PL-RSs are pre-configured or not pre-configured; and
     apply the default self-interference value as the measured self-interference when the one or more PL-RSs are not pre-configured.

7. The apparatus of claim 6, wherein the one or more processors are further configured to receive the one or more PL-RSs for each beam pair included in the one or more beam pairs when the one or more PL-RSs are pre-configured.

8. The apparatus of claim 6, wherein the one or more processors are further configured to receive a pre-configuration for the one or more PL-RSs via radio resource control (RRC) signaling, and wherein the one or more processors are further configured to receive an update for the one or more PL-RSs in association with at least one of a medium access control- control element (MAC-CE) or downlink control information (DCI).

9. The apparatus of claim 6, wherein the one or more PL-RSs are associated with the UL transmission and a downlink (DL) reception, the UL transmission corresponding to an UL beam in the one or more beam pairs, the DL reception corresponding to a DL beam in the one or more beam pairs.

10. The apparatus of claim 9, wherein the UL transmission is at least one of a sounding reference signal (SRS), a physical uplink shared channel (PUSCH), a physical uplink control channel (PUCCH), or a physical random access channel (PRACH).

11. The apparatus of claim 9, wherein the DL reception is at least one of a channel state information-reference signal (CSI-RS), a tracking reference signal (TRS), or a demodulation reference signal (DM-RS).

12. A method of wireless communication at a user equipment (UE), comprising:
   measuring self-interference for one or more beam pairs based on one or more path loss (PL) reference signals (RSs) (PL-RSs), wherein a default self-interference value is the measured self-interference;

adjusting an uplink (UL) transmit (Tx) power for a full duplex (FD) operation based on the self-interference measured for the one or more beam pairs; and transmitting an UL transmission for the FD operation based on the adjustment to the UL Tx power, wherein a first maximum value bounding the UL Tx power is based on the measured self-interference and a second maximum value bounding the UL Tx power, different than the first maximum value, corresponds to a maximum Tx power of the UE, and wherein the first maximum value bounding the UL Tx power is based on a threshold level of self-interference, and wherein the method further comprises:

selecting, for power control and based on the measured self-interference, a power offset, an alpha parameter associated with a slope inversion, and an additional offset; and transmitting the UL transmission based on the first maximum value bounding the UL Tx power and the power control.

13. The method of claim 12, wherein the UL Tx power is based on a predefined algorithm, at least one parameter in the predefined algorithm being dependent on the measured self-interference.

14. The method of claim 12, wherein a level of the self-interference is different for different beam pairs included in the one or more beam pairs.

15. The method of claim 12, wherein the self-interference for the one or more beam pairs changes based on at least one of a time period or an environment.

16. The method of claim 15, wherein the method further comprises re-measuring the self-interference for the one or more beam pairs on a periodic basis.

17. A method of wireless communication at a user equipment (UE), comprising:

measuring self-interference for one or more beam pairs based on a pre-configuration one or more path loss (PL) reference signals (RSs) (PL-RSs), wherein a default self-interference value is the measured self-interference;

adjusting an uplink (UL) transmit (Tx) power for a full duplex (FD) operation based on the self-interference measured for the one or more beam pairs; and transmitting an UL transmission for the FD operation based on the adjustment to the UL Tx power, wherein the method further comprises:

determining whether the one or more PL-RSs are pre-configured or not pre-configured; and applying the default self-interference value as the measured self-interference when the one or more PL-RSs are not pre-configured.

18. The method of claim 17, wherein the method further comprises receiving the one or more PL-RSs for each beam pair included in the one or more beam pairs when the one or more PL-RSs are pre-configured.

19. The method of claim 17, wherein the method further comprises:

receiving a pre-configuration for the one or more PL-RSs via radio resource control (RRC) signaling; and receiving an update for the one or more PL-RSs in association with at least one of a medium access control-control element (MAC-CE) or downlink control information (DCI).

20. The method of claim 17, wherein the one or more PL-RSs are associated with the UL transmission and a downlink (DL) reception, the UL transmission corresponding to an UL beam in the one or more beam pairs, the DL reception corresponding to a DL beam in the one or more beam pairs.

21. The method of claim 20, wherein the UL transmission is at least one of a sounding reference signal (SRS), a physical uplink shared channel (PUSCH), a physical uplink control channel (PUCCH), or a physical random access channel (PRACH).

22. The method of claim 20, wherein the DL reception is at least one of a channel state information-reference signal (CSI-RS), a tracking reference signal (TRS), or a demodulation reference signal (DM-RS).

* * * * *